United States Patent
Sinha et al.

(10) Patent No.: US 12,547,545 B2
(45) Date of Patent: Feb. 10, 2026

(54) SYSTEM AND METHOD FOR SUPPORTING HIGH AVAILABILITY BY USING IN-MEMORY CACHE AS A DATABASE

(71) Applicant: ORACLE INTERNATIONAL CORPORATION, Redwood Shores, CA (US)

(72) Inventors: Anurag Anand Sinha, Gorakhpur (IN); Prakhar Rastogi, Moradabad (IN); Harish Kumar Dalmia, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 276 days.

(21) Appl. No.: 17/968,222

(22) Filed: Oct. 18, 2022

(65) Prior Publication Data
US 2024/0126698 A1 Apr. 18, 2024

(51) Int. Cl.
*G06F 12/0862* (2016.01)

(52) U.S. Cl.
CPC .. *G06F 12/0862* (2013.01); *G06F 2212/1032* (2013.01); *G06F 2212/163* (2013.01); *G06F 2212/6024* (2013.01)

(58) Field of Classification Search
None
See application file for complete search history.

(56) References Cited

U.S. PATENT DOCUMENTS

| 11,544,239 | B2* | 1/2023 | Kumar | G06F 16/248 |
| 2007/0033155 | A1* | 2/2007 | Landsman | G06F 16/957 |
| 2014/0173018 | A1* | 6/2014 | Westphal | H04L 41/0823 709/213 |
| 2019/0108229 | A1* | 4/2019 | Sista | G06F 16/24552 |
| 2019/0243766 | A1* | 8/2019 | Doerner | G06F 12/0862 |
| 2022/0075782 | A1* | 3/2022 | Hines | G06F 16/211 |
| 2023/0127638 | A1* | 4/2023 | Poulain | G06Q 20/3829 705/71 |

* cited by examiner

*Primary Examiner* — Rocio Del Mar Perez-Velez
*Assistant Examiner* — Marwan Ayash
(74) *Attorney, Agent, or Firm* — Kraguljac Law Group LLC (57) ABSTRACT

Systems, methods, and other embodiments for supporting high availability by using in-memory cache as a database are disclosed. In one embodiment, a system includes an application server that is configured to select a sub-set of data from a remote database that is predicted to be accessed by an application server, wherein the application server includes an in-memory cache. The sub-set of data is reformatted to reduce the size. The in-memory cache is configured to act as a backup database by pre-populating the reformatted sub-set of data into the in-memory cache. In response to detecting the remote database is in an off-line state: the in-memory cache is assigned as a primary database to replace the remote database and subsequent data requests are re-directed from being processed using the remote database to being processed using the in-memory cache.

20 Claims, 4 Drawing Sheets

SYSTEM AND METHOD FOR SUPPORTING HIGH AVAILABILITY BY USING IN-MEMORY CACHE AS A DATABASE

BACKGROUND

A conventional application uses some form of a database to persist the data. The persistent storage mostly is in the form of a relational database or a NoSQL database. For applications to work, it is important in most cases for the database to be available most of the time. If the database goes down, the system becomes unusable.

To make a system available when some component fails, a cluster of storage nodes is set up, which eliminates a single point of failure. The cluster is synched with the main node from time to time. If one of the nodes fails, the rest of them can take over. While this works in certain environments, there are some challenges with this approach. For example, a loss of a physical site can cause issues with all of the sets of nodes. Similarly, if the network connectivity is broken to the site, the cluster might become unusable. Furthermore, additional hardware is needed to act as failover nodes, which is costly and more complex to operate.

In prior designs of web architecture, databases and clusters of databases were still susceptible to be a single point of failure. Intermittent connection issues with the network or database still cause the database to go down (i.e., become off-line). This connection issue usually increases the downtime of the application using the database and decreases the availability of the system since the system cannot process any subsequent data requests when the database is down. A more efficient backup system may be desired.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that implement a novel technique to eliminate a single point of failure of a database and provides high availability for an application layer without dependency on the database by using in-memory cache as a database. In one embodiment, the present system and method provide a solution that removes the dependency at the database layer. In this manner, the high availability for the application layer is not reliant upon being connected to the database, and instead the high availability is dependent upon being supported at the application layer through the use of the in-memory cache. The present technique eliminates adding additional redundant components and hardware to act as a backup database. Rather, the present technique implements existing cache hardware to function as a database and service data requests when the primary database goes off-line for any reason.

In particular, the high availability of the application layer is based upon using in-memory caching techniques for cache generation and data consumption strategies. It can be an optimum and efficient cache methodology, since the present system and method use the in-memory cache as a replacement for the relational database by storing key-value pairs on the in-memory cache, while still using the in-memory cache in a relational database concept.

In another embodiment, the present system and method can be run as a background scheduled job or on-demand.

In another embodiment, the present system and method utilizes another layer of storage (in-memory cache) that is maintained at the application level (i.e., outside of the database layer). As discussed above, the present system and method eliminates the database dependency issues when the database goes off-line and the system can continue operating since the in-memory cache is available.

In another embodiment, consider a web application in which the application server is running on a data center. The database usually is a different product and will most likely be hosted on a different pod/site. The application server maintains a minimum amount of information required to run a product in an in-memory cache. However, the present system may use different strategies to pre-populate the in-memory cache with additional data (e.g., data predicted to be used) to serve as a backup database. For example, one strategy is to maintain a grain level and pre-populate the in-memory cache with a user's associated data when the user accesses the application. Another strategy may be to frequently run a background job that selects a set of data, pull selected data from the database, and store the selected data in the in-memory cache.

Thus, the pre-populating occurs prior the selected data being requested or queried by a user, or otherwise prior to the selected data being part of a search result that would typically cause the search result to be stored in the cache.

The present application server is configured to detect when there is a failure in the database (e.g., the database goes off-line or otherwise becomes disconnected from the application server). In that case, application server switches over to the in-memory cache to serve data requests until the database is back on-line. The in-memory cache is operated as a temporary replacement and/or backup database for the primary database that is off-line. As such, the in-memory cache is assigned to act as a primary database (e.g., function as the primary source of data) to replace the database that is off-line.

Thus, the present system and method aim to provide the ability for users to continue using their application and submit data requests even when the database is off-line until the connection between the database and the application server is restored. Furthermore, the data in the in-memory cache can be structured like a relational database so that redundant data can be stored only once. This will lower the memory footprint on the application side.

Figure 1:
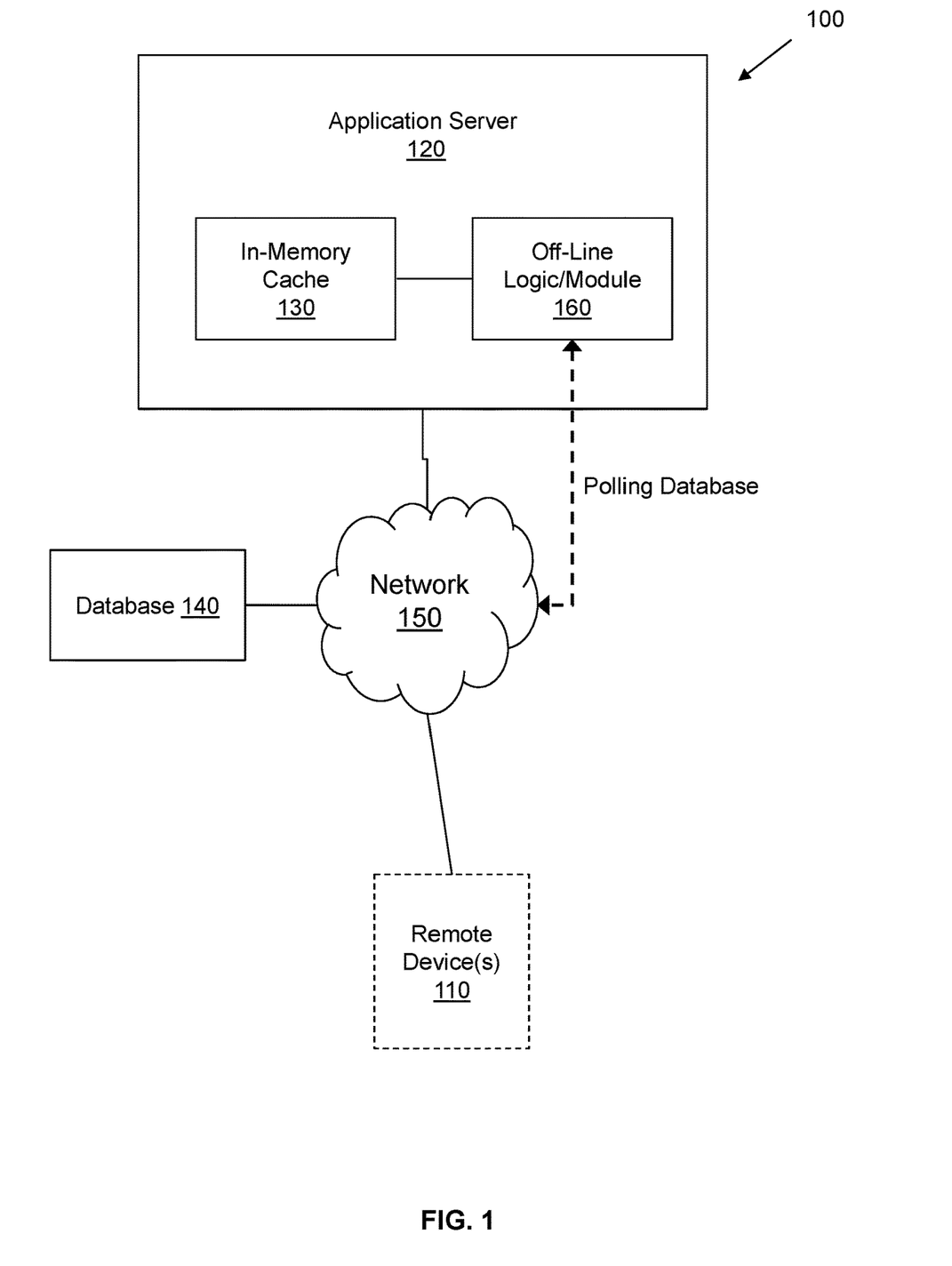
FIG. 1 illustrates one embodiment of a system for supporting high availability in an application layer by using in-memory cache as a database.

With reference to FIG. 1, one embodiment of a system 100 for supporting high availability in an application layer without total dependency on a database by using in-memory cache as a database is illustrated. The system 100 includes, for example, an application server 120 having a network interface(s) to communicate to a network 150, an in-memory cache 130, one or more remote relational databases 140, and off-line logic 160. One or more remote devices 110 (e.g., client devices, computers, mobile devices, etc.) may connect with the application server 120 via the network to access the data from the database 140.

In one embodiment, the off-line logic 160 is configured as executable code (e.g., executable module) that pre-loads or pre-populates the in-memory cache 130 with selected data from the database 140 for the purpose of functioning as a backup database when the remote database 140 goes off-line. For example, the off-line logic 160 selects the data based on a prediction of what data one or more users might use during an upcoming time period (e.g., data predicted to be used today when a user logs into the server 120). The prediction may be based on previously used data and/or applications such as email data of a user, which is known to be used frequently by the user. By pre-loading the in-memory cache 130 with data, the in-memory cache 130 will be used by the server 120 as a backup database in case the database 140 goes off-line for any reason.

The off-line logic 160 is configured to detect when the database 140 goes off-line. Being off-line includes any time when the application server 120 does not receive communications or responses from the database 140. In one embodiment, the off-line logic 160 may be configured to maintain an on-line status flag that indicates the status of the database 140 as on-line or off-line. In response to detecting the database is off-line, the off-line logic 160 causes the application server 120 to use the in-memory cache 130 to process requests that are directed to the database 140. Thus, data requests to the database 140 are not sent to the database 140 while the database is off-line to avoid potential errors or error messages.

Instead, the in-memory cache 130 is used to process data requests and thus functions as a temporary replacement for the off-line database. This allows the applications on the remote devices 110 to continue operating with the application server 120 as though the database 140 is on-line rather than causing the remote devices 110 to stop operating and/or receive error messages due to the off-line database. When a data request is not satisfied by the in-memory cache (a cache miss), the application server 120 does not submit the data request to the database 140 (as would be normally done) since the database 140 is off-line.

In one embodiment, remote device 110 can be, but is not limited to, a smartphone, tablet, laptop or other similar computing device that is capable of interacting with the application server 120 through a network connection (e.g., network interface, transceiver, etc.). Furthermore, remote device 110 should be capable of allowing a user to interact with application server 120 through a mobile application or browser that can be accessed by the remote device 110. As will be discussed in greater detail later, the mobile application or browser on the remote device 110 will allow the user to interact with the application server 120 in order to allow the user to run an application on the remote device 110 and access data on the database 140 via the application server 120.

In one embodiment, in-memory cache 130 is located within or operatively connected to the application server 120. In one embodiment, the in-memory cache 130 is configured to act as an in-memory data structure store that can be used as a distributed, in-memory key—value database, cache and message broker, with optional durability such as being implemented with Redis (Remote directory server) ("Redis cache") or a general-purpose distributed memory-caching system (such as "Memcache").

As shown in FIG. 1 and discussed in greater detail later, the status of the connection between the database 140 and the application server 120 may be asynchronously "polled" or otherwise periodically checked by the off-line logic 160 to determine if the database 140 is in an on-line or off-line state with respect to the application server 120. Polling may be performed by sending a ping signal or other heartbeat message to the database to determine if the database is responsive and thus on-line. Polling may also be performed by the off-line logic 160 and/or the application server 120 sending a fake or an actual data request to the database 140. If the application server 120 receives a response from the database 140, then the database 140 is considered to still be on-line. Example database responses may include providing the requested data or responding that the requested data is not found in the database.

If the application server 120 does not receive a reply to the data request or receives an error message, then the off-line logic 160 may decide/detect that the database 140 is off-line. Various reasons may exist that cause the off-line status, for example but not limited to, the network connection to the database 140 has been lost, the database has stopped operating, a hardware error, a power outage, etc. Example error messages may include, but are not limited to, request failed, request not delivered, connection lost, request time-out, etc.

In response to detecting that the database is off-line, the application server 140 switches to using the in-memory cache 130 as a backup database to process subsequent data requests to allow users to continue operations. As such, data requests are re-directed to the in-memory cache 130 and high availability is provided to users to continue operating with the data in the in-memory cache rather than getting an error message that the database 140 is offline.

When the database 140 is detected to be off-line and requests are switched to the in-memory cache 130, the off-line logic 160 may periodically poll the database 140 to determine when the database 140 is back on-line. In response to detecting an on-line status, the application server 120 switches operations back to using the database 140, and the in-memory cache 130 is used as a cache in combination with the database 140 as usual. For example, the in-memory cache 130 is first checked to determine if requested data is present, and if not present (a cache miss), the data request is sent to the database 140 to retrieve the requested data.

Figure 2:
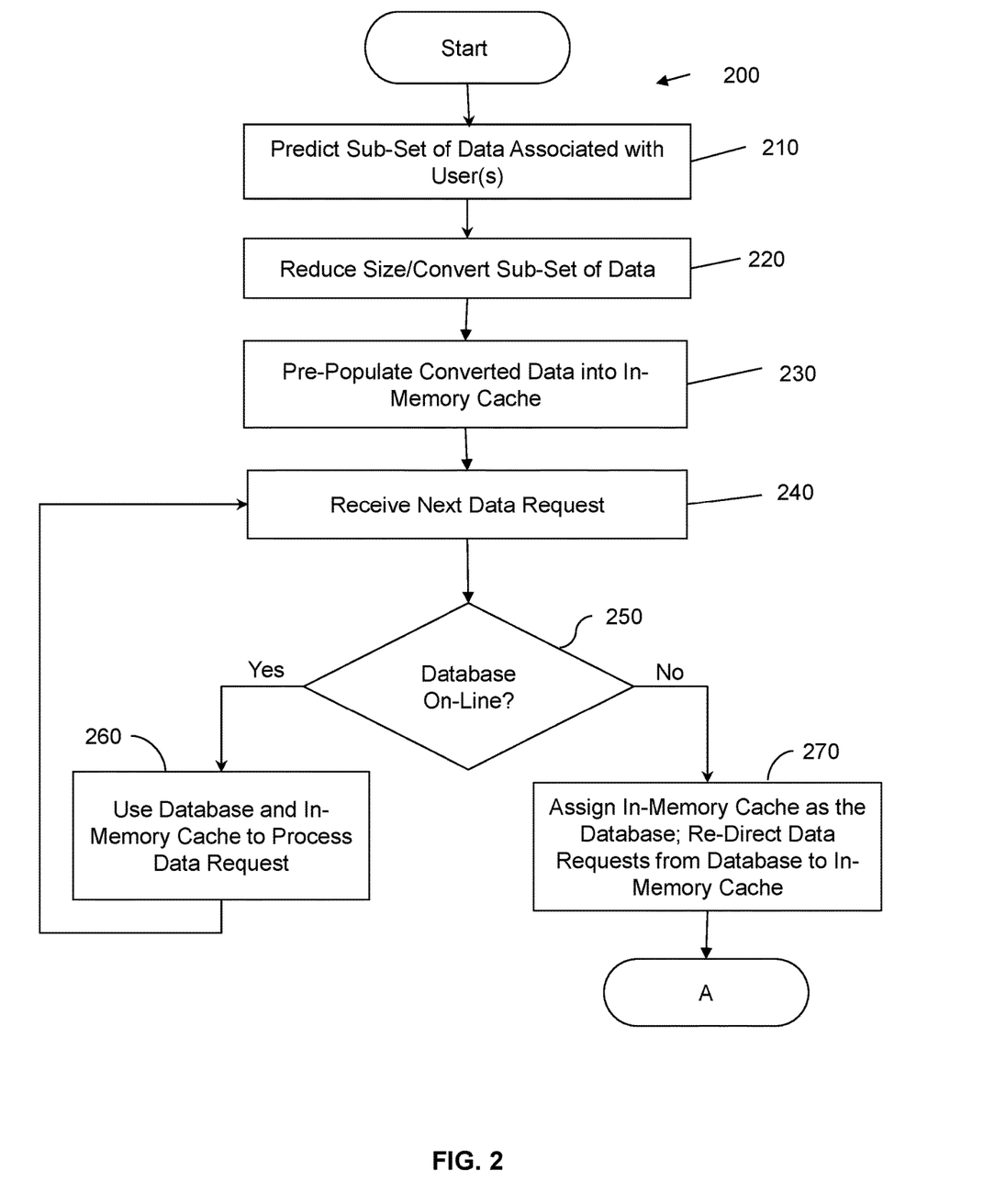
FIG. 2 illustrates one embodiment of a method performed by the system in FIG. 1 for supporting high availability.

With reference to FIG. 2, one embodiment of a method 200 for supporting high availability in an application layer without total dependency on a database by using in-memory cache as a database is illustrated. The method 200 is performed by the off-line logic 160 and application server 120 of FIG. 1. In general, the method 200 creates a backup database system near the application layer (i.e. at the Cache Layer) by using the in-memory cache as the backup database. The method 200 is performed by at least a processor of the application server 120 and the off-line logic 160 of FIG. 1 that accesses and interacts with memories and/or data storage devices. For example, the processor at least accesses and reads/writes data to the memory and processes network communications to perform the actions of FIG. 2.

As discussed above, for running applications on remote devices, the remote device is used to interact with the application server in order to access the requested user data.

In one embodiment, the application server will access a reserved storage location (not shown), which collects temporary data to help websites, browsers, and applications to run, to determine if the requested user data is available in the storage location. If the requested user data is not located in the reserved storage location, the application server will then access the database 140. If the requested user data is available in the database, the database will retrieve and return the requested user data to the application on the remote device so that the application can run. However in prior systems, as discussed above, if the network connection between the application server and the database is lost (i.e., the database is in an off-line state), the application server will not be able to access the requested user data and, ultimately, the application on the remote device will not be able to run (e.g., the application also goes down).

In order to address the above issues encountered in the prior systems and methods for running applications on remote devices, attention is now directed to FIG. 2. Method 200 is initiated by the off-line logic 160, for example, at a periodic time to pre-load or pre-populate the in-memory cache 130 with data from the database 140 so that the in-memory cache 130 serves as a backup database once the primary database 140 goes off-line.

In FIG. 2 at block 210, to pre-load the in-memory cache, in one embodiment, the off-line logic 160 generates a prediction about which data to select from the database 140 that one or more users is likely to use. The selected data is a sub-set of data since the entire database 140 is typically a much larger storage device than the in-memory cache. Thus, the in-memory cache can only store a sub-set of data from the database. The selected data is then retrieved from the database 140 and pre-populated in the in-memory cache 130 in order to allow an application to run on remote device 110 (FIG. 1) when the database goes off-line. Being pre-populated or pre-loaded, in general, means that the data has not yet been requested by a user.

In one embodiment, the sub-set of data associated with the user(s) is predicted according to what applications the user will likely run on the remote device 110 and what data will be needed to run those applications. For example, if the user regularly runs an email application on the remote device 110, the sub-set of data may include data from the email application that will be used to run the application and/or the data the user requests from the email application. Also, if there is data that is common to all users of the application, then the sub-set of data may include data that will be likely be used for all application users to run the application when any of the users login and run the application.

In one embodiment, when there is a limitation of cache size in the in-memory caches, which is typically much smaller that the storage capacity of the database, the system cannot store a large amount of data in the caches. To overcome this limitation, the present system supports a one-tier or two-tier cache design with the use of in-memory caches like Memcache and Redis (one-tier design) and may add a CDN (two-tier design). The CDN (Content Delivery Network) refers to a geographically distributed group of servers which work together to provide fast delivery of Internet content.

For example, suppose the application server has 100 tenants/users using an application and each tenant has 100 MBs of data in the database that is equivalent to 100×100 MB=10,000 MBs=10 GBs of cache that would be needed to store all the data. However, an in-memory cache is typically much smaller than 10 GBs and cannot store all the tenant data.

Thus, in one embodiment, selecting which data to pre-load into the in-memory cache (the predicted data) may be based on selecting the data from certain tenants/users. The certain tenants/users selected may be based on a frequency of how often a tenant visits and uses the application server. Thus, the server may have a group of high frequency visiting tenants and a group of low frequency visiting tenants, which can be determined from history logs that identify user logins and/or access.

The off-line logic 160 may be configured to retrieve data from the history logs and determine which users have the highest frequency of use (e.g., based on a defined threshold). Suppose that based on history logs (e.g., user logins) that 20 tenants visited frequently and use the application many times (above the threshold) and the other 80 tenants are occasional or less often visitors (below the threshold). In this case, the application server and off-line logic 160 may select and retrieve the data from the database 140 associated with the 20 most frequent users. The retrieved data (which is the predicted sub-set of data from the database) is then stored near the application layer in the in-memory cache 130 (e.g., configured with Redis) in the application server to pre-populate the in-memory cache 130. Thus, when the database goes off-line, the 20 most frequent users will have all their data available from the in-memory cache without experiencing any downtime caused by the off-line database.

In another embodiment, the off-line logic 160 may be configured to additionally select and cache data of all the 100 tenants in the CDN as a backup. In this manner, the combination of the in-memory cache and the CDN creates a two-tier caching system to replace the off-line database. This additional functionality helps the application server to scale the present high availability cache mechanism to large applications as well.

In one embodiment, selecting which data to pre-load into the in-memory cache (the predicted data) may be based on selecting the data and/or data tables that have been most frequently used/accessed by users. The frequently used data may be determined from, for example, query history logs that identify what data is being requested or from other types of history transaction logs. The frequency determination may be made from a recent time period such as from the previous day, previous week, or previous month, etc.

In another embodiment, the selected data may be based on a user login. When a particular user logs in or otherwise accesses the application server 140, then all the data associated to that particular user and/or user account may be retrieved from the database 140 and pre-loaded into the in-memory cache 130 prior to the user requesting any particular data. Thus, the selected data that is pre-loaded in the in-memory cache 130 is pre-loaded prior to the selected data being part of a search result, a query result, or a user request, which are typical trigger events for storing data into a cache.

At block 220, prior to storing the retrieved sub-set of data in the cache, in one embodiment, the retrieved data may be reduced in size by changing the data format or otherwise compressing the data to reduce the amount of cache memory used. In one embodiment, the database 140 is a relational database, which is based on a data format of tables, rows, and columns. The retrieved relational data may be converted to a data format different than the relational format. For example, the relational data may be converted to a key-value format, which takes up less memory space than relational data. Thus, the application server is configured to convert the predicted sub-set of data associated with the applications that the users are likely to run to a key-value pair format.

There are various techniques to convert relational data to key-value format, which are beyond the scope of this disclosure and are understood by those of ordinary skill in the art. In another embodiment, the predicted sub-set of data may be used in its data format as retrieved from the database without format conversion or compression.

At block 230, after the predicted sub-set of data is retrieved or converted/reduced in size, the application server 120 pre-populates the in-memory cache 130 with the converted sub-set of data. In one embodiment, the pre-populated sub-set of data is now available and can then be accessed by the application server 120 if and when the database 140 goes off-line, as will discussed in greater detail later.

The functions of blocks 210-230 are performed to prepare the application server and the in-memory cache as a backup database in case the remote database goes off-line. The following functions are performed subsequently to process data requests and to detect an off-line status of the database.

At block 240, the application server 120 is accessed by a remote device 110 and the server receives a data request from a user. In one embodiment, the user opens an application on the remote device 110. For example, the user may open an application on a smartphone. Also, the user can open a browser on the remote device 110 and access the application. In either event, the application or the browser will interact with the application server 120 through a network connection so that the application server 120 can process the user request for data related to the application and access the relevant user related data from the in-memory cache 130 and/or the database 140.

At block 250, the application server 120 with the offline-logic 160 determines whether the database 140 is on-line or off-line. For example, the database 140 is on-line (from the perspective of the application server 120) when the application server 120 is receiving communications/responses from the database 140 (e.g., the database responds to polling). The database 140 is considered off-line (from the perspective of the application server 120) when the application server 120 is not receiving communications/responses from the database 140. In one embodiment, the status of the database is determined from an on-line status flag that is set by the off-line logic based on the results of polling the database.

As previously stated, various reasons may exist that cause the off-line status. For example, but not limited to, the network connection between the application server 120 and the database 140 has been lost, the database has stopped operating, a hardware error, a power outage, etc. The actual problem may not be known to the application server 120 but the application server 120 determines the status based on whether the server receives responses to the polling requests.

In one embodiment, the application server 120 is configured to continuously perform an asynchronous polling of the database 140 to determine if the database 140 is responsive and thus on-line. The application server 120 can perform the polling at regularly scheduled intervals such as every 10-15 seconds, every 5-10 minutes, hourly, daily, or the like. When the database 140 does not reply to a poll (or two or more consecutive polls), the database is considered off-line. The on-line or off-line status is stored in the on-line status flag (e.g., "1" means on-line, "0" means off-line).

In response to the database being on-line at block 250, the method moves to block 260 and the application server processes the data request as usual by using the database as the primary database and using the in-cache memory as a cache to locate and retrieve the requested data. If the database was previously in an off-line state and is now on-line, then the application server also reassigns the in-memory cache to no longer function as the primary database (described below) and now function as a cache. The remote database, which is now on-line, is assigned as the primary database.

In response to the database being off-line at block 250, then the application server switches to using only the in-memory cache as the primary database (block 270). If the database was already off-line and the in-memory cache is currently assigned as the primary database, then the application server continues to use the in-memory cache as the database. Data requests are re-directed to be processed using the in-memory cache and not the off-line database.

Thus, the manner in which data requests are processed is changed and the in-memory cache is now activated as the primary database to replace the off-line database. In other words, the application server assigns the in-memory cache as a primary database to replace the remote database that is off-line. As a result, the present system eliminates the database dependency issues when the database goes off-line and the system can continue operating since the in-memory cache is available. The method continues to FIG. 3, which describes processing a data request using the in-memory cache.

Figure 3:
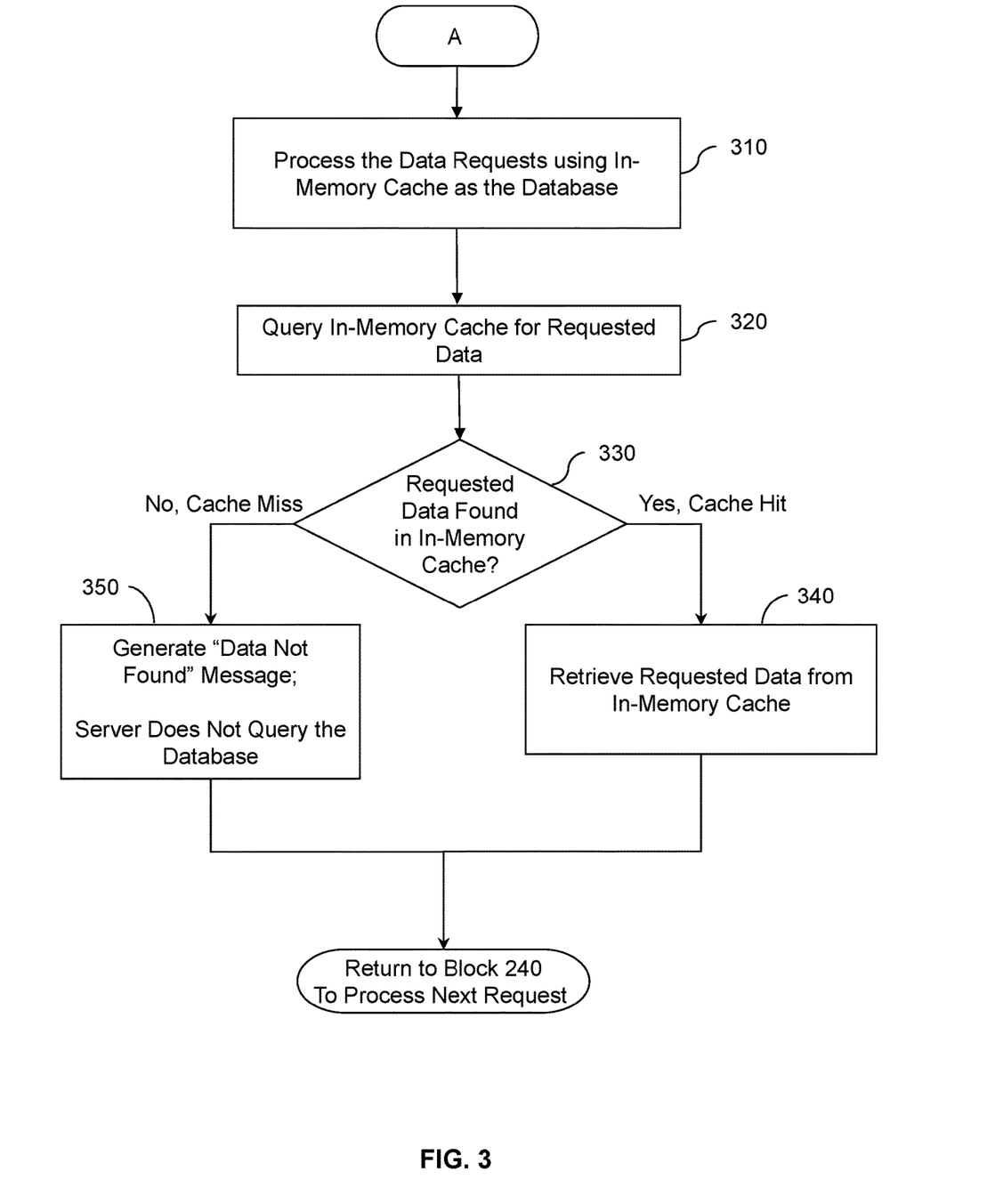
FIG. 3 illustrates one embodiment of a continuation of FIG. 2 for processing database requests using an in-memory cache as the primary database when the remote database is off-line.

With reference to FIG. 3, at block 310, the application server 120 is configured to process the data requests, which are received subsequent to the database going off-line, using the in-memory cache 130 as the primary database. At block 320, the in-memory cache is queried and/or accessed to determine if the requested data is contained within the in-memory cache. A determination is made at block 330 based on whether the in-memory cache returns the requested data (cache hit) or returns a message that the requested data is not found (cache miss).

When the requested data is found in the cache (cache hit), then the requested data is retrieved from the in-memory cache 130 (block 340) and the data is returned to the user that requested the data. If the data in the cache was previously reformatted or otherwise compressed prior to storage, then the reverse process may be performed prior to returning the data to the user, as needed.

When the requested data is not found in the in-memory cache (a cache miss), then the application server generates and returns a message to the user that the requested data is not found or another similar message (block 350). The application server discontinues communication to the off-line database and does not attempt to query or use the database while the database is off-line. The application server does not submit the data request to the database to find the requested data as would be performed if the database is on-line and a cache miss occurs. In the embodiment with the two-tier design (e.g., in-memory cache plus a Content Delivery Network (CDN), the application server may query the CDN to locate the data when a cache miss occurs at block 330.

Thereafter, the method returns to block 240 of FIG. 2 to process the next received data request and the process continues.

In another embodiment, while the network connection between the application server 120 and the database 140 is lost (i.e., the database 140 is in an off-line state), there may be operations where the user has modified some data rather than simply retrieving data from the in-memory cache. Since the database 140 is off-line, the modifications cannot be submitted to the database 140. As such, the application server and off-line logic 160 are configured to keep track of the data modifications, which have occurred in the in-memory cache. When the off-line logic 160 detects that the database 140 is back on-line, then write-back operations are initiated, and all the data changes are sent back to the database 140 to synchronize the modifications made in the in-memory cache to the database 140.

Accordingly, the present system and method increases the availability of a service outside of the database layer and reduces the dependency on the database. The present system creates a backup database system near the application layer (i.e. at the Cache Layer) by using the in-memory cache as a replacement database. Thus, the in-memory cache is assigned or reclassified to function as the primary database to replace the actual primary database when the primary database goes off-line. This allows users to continue to use the application server and access data from the in-memory cache rather than experiencing downtime due to the off-line database.

Computing Device Embodiment

Figure 4:
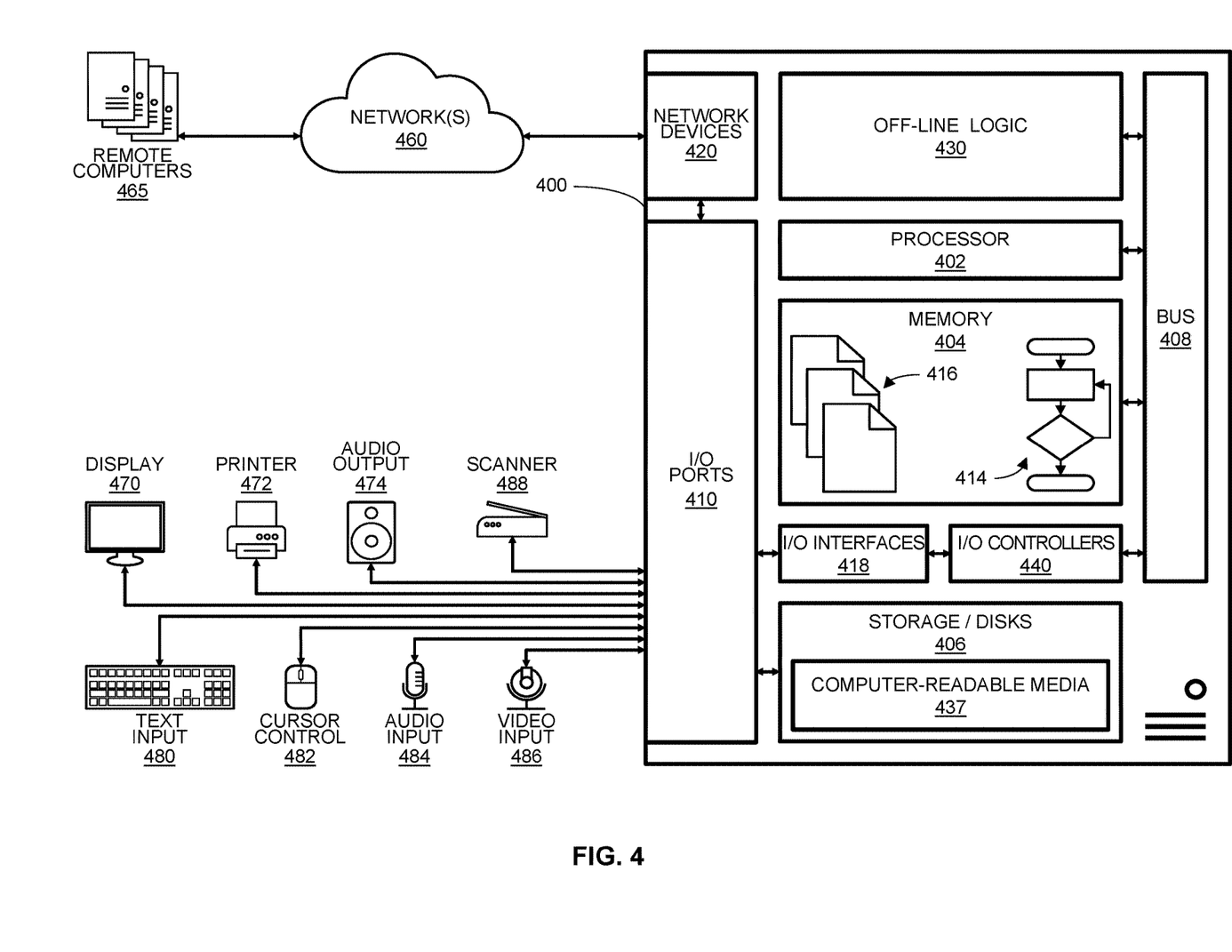
FIG. 4 illustrates an embodiment of a computing system configured with the example systems and/or methods disclosed.

FIG. 4 illustrates an example computing device that is configured and/or programmed as a special purpose computing device with one or more of the example systems and methods described herein, and/or equivalents. The example computing device may be a computer 400 that includes at least one hardware processor 402, a memory 404, and input/output ports 410 operably connected by a bus 408. In one example, the computer 400 may include off-line logic 430 configured to facilitate configurating and uses an in-memory cache as a database when a remote database goes off-line similar to off-line logic/module 160 and methods shown in FIGS. 1-3.

In different examples, the logic 430 may be implemented in hardware, a non-transitory computer-readable medium 437 with stored instructions, firmware, and/or combinations thereof. While the logic 430 is illustrated as a hardware component attached to the bus 408, it is to be appreciated that in other embodiments, the logic 430 could be implemented in the processor 402, stored in memory 404, or stored in disk 406.

In one embodiment, logic 430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to XXX. The means may also be implemented as stored computer executable instructions that are presented to computer 400 as data 416 that are temporarily stored in memory 404 and then executed by processor 402.

Logic 430 may also provide means (e.g., hardware, non-transitory computer-readable medium that stores executable instructions, firmware) for performing XXX.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output (I/O) interface (e.g., card, device) 418 and an input/output port 410 that are controlled by at least an input/output (I/O) controller 440. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with, control, and/or be controlled by input/output (I/O) devices via the input/output (I/O) controller 440, the I/O interfaces 418, and the input/output ports 410. Input/output devices may include, for example, one or more displays 470, printers 472 (such as inkjet, laser, or 3D printers), audio output devices 474 (such as speakers or headphones), text input devices 480 (such as keyboards), cursor control devices 482 for pointing and selection inputs (such as mice, trackballs, touch screens, joysticks, pointing sticks, electronic styluses, electronic pen tablets), audio input devices 484 (such as microphones or external audio players), video input devices 486 (such as video and still cameras, or external video players), image scanners 488, video cards (not shown), disks 406, network devices 420, and so on. The input/output ports 410 may include, for example, serial ports, parallel ports, and USB ports.

The computer 400 can operate in a network environment and thus may be connected to the network devices 420 via the I/O interfaces 418, and/or the I/O ports 410. Through the network devices 420, the computer 400 may interact with a network 460. Through the network, the computer 400 may be logically connected to remote computers 465. Networks with which the computer 400 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method performed by a computing system comprising at least one processor, the method comprising:
   predicting a sub-set of data associated with one or more users that is likely to be accessed from a database by an application server;
   converting, by the application server, the predicted sub-set of data to a key-value pair format;
   pre-populating, by the application server, the converted sub-set of data into an in-memory cache of the application server;

detecting, by the application server, that the database is in an off-line state;

in response to the application server detecting the database is in the off-line state:

assigning the in-memory cache as a primary database to replace the database that is in the off-line state;

re-directing subsequent data requests from one or more remote devices from being processed using the database to being processed using the in-memory cache of the application server;

receiving, by the application server, a subsequent data request from a remote client device via network communications;

in response to the application server receiving the subsequent data request from a remote client device via network communications, retrieving a requested data from the in-memory cache of the application server, and returning the requested data when located to the remote client device;

allowing data modifications to occur in the in-memory cache while the database is offline;

tracking the data modifications that change data within the in-memory cache;

detecting, by the application server that the database changes from the off-line state to an on-line state; and in response to the application server detecting that the database changes from the off-line state to the on-line state, performing write-back operations to synchronize the data modifications made in the in-memory cache to the database.

2. The method of claim 1, wherein re-directing subsequent data requests from being processed using the database to be processed using the in-memory cache further comprises:

switching the subsequent data requests from being directed to the database to being directed to the in-memory cache of the application server;

wherein the application server accesses the in-memory cache to retrieve the requested data; and in response to the requested data not being found in the in-memory cache, the application server does not attempt to retrieve the requested data from the database.

3. The method of claim 1, wherein method further comprises:

polling, by the application server, the database to determine if a network connection between the application server and the database has been lost.

4. The method of claim 1, wherein predicting the sub-set of data associated with one or more users comprises:

determining a group of frequent users of the application server from a plurality of users;

identifying and retrieving a set of data from the database that is associated with the group of frequent users; and pre-populating the in-memory cache with the identified set of data as the predicted sub-set of data.

5. The method of claim 1, wherein predicting the sub-set of data associated with one or more users comprises:

in response to a first user logging into the application server:

identifying and retrieving a set of data from the database that is associated with the first user; and pre-populating the in-memory cache with the identified set of data as the predicted sub-set of data.

6. The method of claim 1, wherein in response to detecting that the database is in the off-line state further comprises:

assigning the in-memory cache as a primary database to replace the database that is off-line.

7. The method of claim 1, wherein the converting comprises converting the sub-set of data from a relational format to the key-value pair format.

8. A non-transitory computer-readable medium that includes stored thereon computer-executable instructions that when executed by at least a processor of a computer cause the computer to:

select a sub-set of data from a remote database that is predicted to be accessed by an application server, wherein the application server includes an in-memory cache;

reformat the sub-set of data to reduce the size of the sub-set of data;

configure, by the application server, the in-memory cache to act as a backup database by pre-populating the reformatted sub-set of data into the in- memory cache;

in response to the application server detecting the remote database is in an off-line state:

assign the in-memory cache of the application server as a primary database to replace the remote database that is in the off-line state;

re-direct subsequent data requests from being processed using the remote database to being processed using the in-memory cache of the application server;

wherein the subsequent data requests are data requests received by the application server from one or more remote client devices via network communications and are received subsequent to detecting that the remote database is in the off-line state;

allow data modifications to occur in the in-memory cache while the remote database is offline, wherein the data modifications are requested from the one or more remote client devices;

track the data modifications that change data within the in-memory cache: and in response to the application server detecting that the remote database changes from the off-line state to an on-line state, perform write-back operations to synchronize the data modifications made in the in-memory cache to the remote database.

9. The non-transitory computer-readable medium of claim 8, wherein the instructions to re-direct the subsequent data requests from being processed using the remote database further comprising instructions that, when executed by at least the processor, cause the processor to:

switch the subsequent data requests from being directed to the remote database to being directed to the in-memory cache of the application server;

wherein the application server accesses the in-memory cache to retrieve requested data from a data request;

in response to finding the requested data in the in-memory cache, retrieve the requested data from the in-memory cache, and return the requested data to a remote client device that made the data request; and in response to the requested data not being found in the in-memory cache, generate and return a message to the remote client device that the requested data is not found;

wherein the application server does not attempt to retrieve the requested data from the remote database.

10. The non-transitory computer-readable medium of claim 8, further comprising instructions that, when executed by at least the processor, cause the processor to:

poll, by the application server, the remote database to determine if a connection between the application server and the remote database has been lost.

11. The non-transitory computer-readable medium of claim 8, further comprising instructions that, when executed by at least the processor, cause the processor to:
   in response to detecting that the remote database changes from the off-line state to an on-line state:
      reassign the in-memory cache from functioning as the primary database to function as a cache; and
      assign the remote database as the primary database.

12. The non-transitory computer-readable medium of claim 8, wherein the instructions to select the sub-set of data from the remote database further comprise instructions that, when executed by at least the processor, cause the processor to:
   determine a group of frequent users of the application server from a plurality of users;
   identify and retrieve a set of data from the remote database that is associated with the group of frequent users; and
   pre-populate the in-memory cache with the identified set of data as the sub-set of data that is predicted to be accessed;
   wherein the pre-populating occurs prior to the identified set of data being requested by a user or being part of a query result.

13. The non-transitory computer-readable medium of claim 8, wherein the instructions to select the sub-set of data from the remote database further comprise instructions that, when executed by at least the processor, cause the processor to:
   in response to a first user logging into the application server from a first remote device:
      identify and retrieve a set of data from the remote database that is associated with the first user; and
      pre-populating the in-memory cache of the application server with the identified set of data as the sub-set of data that is predicted to be accessed;
      wherein the pre-populating occurs prior to the first user requesting the identified set of data.

14. The non-transitory computer-readable medium of claim 8, wherein the instructions to reformat the sub-set of data to reduce the size further comprise instructions that, when executed by at least the processor, cause the processor to:
   convert the sub-set of data from a relational format to a key-value pair format;
   wherein the sub-set of data in key-value pair format is pre-loaded into the in-memory cache.

15. A computing system configured as an application server, comprising:
   at least one processor connected to at least one memory;
   an in-memory cache operably connected to the application server and the at least one processor;
   a non-transitory computer readable medium including instructions stored thereon that, when executed by the at least one processor, cause the at least one processor to:
   select a sub-set of data from a remote database that is predicted to be accessed by the application server via network communications;
   reformat the sub-set of data to reduce the size of the sub-set of data;
   configure, by the application server, the in-memory cache to act as a backup database by pre-populating the reformatted sub-set of data into the in-memory cache of the application server; and
   in response to detecting a network connection between the application server and the remote database is lost that causes the remote database to be in an off-line state:
      assign the in-memory cache of the application server as a primary database to replace the remote database with the in-memory cache of the application server to function as the primary database to eliminate dependency on the remote database;
      wherein a data request received by the application server from a remote client device via a second network connection is processed using the in-memory cache of the application server;
      allowing data modifications to occur in the in-memory cache while the remote database is offline, wherein the data modifications are requested from the remote client device:
      tracking the data modifications that change data within the in-memory cache; and
      in response to the application server detecting that the remote database changes from the off-line state to an on-line state, perform write-back operations to synchronize the data modifications made in the in-memory cache to the remote database.

16. The computing system of claim 15, wherein the instructions to replace the remote database further comprising instructions that, when executed by at least the processor, cause the processor to:
   re-direct subsequent data requests from being processed using the remote database to being processed using the in-memory cache;
   wherein the application server accesses the in-memory cache to retrieve requested data from a data request received from a remote client device;
   in response to finding the requested data in the in-memory cache, retrieve the requested data from the in-memory cache, and return the requested data to the remote client device; and
   in response to the requested data not being found in the in-memory cache, generate and return a message to the remote client device that the requested data is not found;
   wherein the application server does not attempt to retrieve the requested data from the remote database.

17. The computing system of claim 15, wherein the instructions further include instructions that, when executed by at least the processor, cause the processor to:
   poll, by the application server, the remote database to determine if a connection between the application server and the remote database has been lost.

18. The computing system of claim 15, wherein the instructions further include instructions that, when executed by at least the processor, cause the processor to:
   in response to detecting that the remote database changes from the off-line state to an on-line state:
      reassign the in-memory cache from functioning as the primary database to function as a cache; and
      assign the remote database as the primary database.

19. The computing system of claim 15, wherein the instructions to select the sub-set of data from the remote database further comprise instructions that, when executed by at least the processor, cause the processor to:
   determine a group of frequent users of the application server from a plurality of users;

identify and retrieve a set of data from the remote database that is associated with the group of frequent users; and pre-populate the in-memory cache with the identified set of data as the sub-set of data that is predicted to be accessed;

wherein the pre-populating occurs prior to the identified set of data being requested by a user or being part of a query result.

20. The computing system of claim 15, wherein the instructions to reformat the sub-set of data to reduce the size further comprise instructions that, when executed by at least the processor, cause the processor to:

convert the sub-set of data from a relational format to a key-value pair format;

wherein the sub-set of data in key-value pair format is pre-loaded into the in-memory cache.

\* \* \* \* \*